US012643826B2

(12) United States Patent
Shibuya et al.

(10) Patent No.: US 12,643,826 B2
(45) Date of Patent: Jun. 2, 2026

(54) SINTERED BODY HAVING PORES AND METHOD FOR PRODUCING THE SAME

(71) Applicant: NEC Corporation, Tokyo (JP)

(72) Inventors: Akinobu Shibuya, Tokyo (JP); Taizo Shibuya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 816 days.

(21) Appl. No.: 17/889,465

(22) Filed: Aug. 17, 2022

(65) Prior Publication Data

US 2023/0077215 A1 Mar. 9, 2023

(30) Foreign Application Priority Data

Aug. 26, 2021 (JP) ................................. 2021-138196

(51) Int. Cl.
| | |
|---|---|
| *C04B 35/547* | (2006.01) |
| *C04B 35/64* | (2006.01) |
| *C04B 38/00* | (2006.01) |
| *C04B 38/02* | (2006.01) |

(52) U.S. Cl.
CPC ............ *C04B 35/547* (2013.01); *C04B 35/64* (2013.01); *C04B 38/0054* (2013.01); *C04B 38/02* (2013.01); *C04B 2235/3236* (2013.01);

*C04B 2235/442* (2013.01); *C04B 2235/446* (2013.01); *C04B 2235/666* (2013.01)

(58) Field of Classification Search
CPC ... C04B 35/547; C04B 35/64; C04B 38/0054; C04B 2235/446
See application file for complete search history.

(56) References Cited

U.S. PATENT DOCUMENTS

| | | | |
|---|---|---|---|
| 4,529,633 A | 7/1985 | Karlsson | |
| 2005/0126628 A1* | 6/2005 | Scher ..................... | B82Y 10/00 136/263 |

FOREIGN PATENT DOCUMENTS

| | | |
|---|---|---|
| JP | 2004-053039 A | 2/2004 |
| WO | 2020/241388 A1 | 12/2020 |

* cited by examiner

*Primary Examiner* — Cameron K Miller
(74) *Attorney, Agent, or Firm* — Sughrue Mion, PLLC

(57) ABSTRACT
Disclosed is a sintered body comprising (a) a matrix material comprising at least one selected from ZnS and ZnSe, (b) an oxide that is present in a form of islands in the matrix material, comprising at least one metal selected from the group consisting of Ca, Sr and Ba, and (c) pores that are present in a form of islands in the matrix material. The sintered body has sufficient strength and an infrared stealth effect in an infrared region such as a MWIR and LWIR region.

6 Claims, 8 Drawing Sheets

SINTERED BODY HAVING PORES AND METHOD FOR PRODUCING THE SAME

This application is based upon and claims the benefit of priority from Japanese patent application No. 2021-138196, filed on Aug. 26, 2021, the disclosure of which is incorporated herein in its entirety by reference.

TECHNICAL FIELD

The present invention relates to a sintered body having pores having an action of suppressing a radiation of infrared rays emitted from a surface of an object, and a method for producing the same.

BACKGROUND ART

As a technique for detecting vehicles, flying objects, and ships by thermal infrared rays, sensors compatible with medium wave infrared rays (MWIR) having a wavelength of 3 to 5 μm and sensors compatible with long wave infrared rays (LWIR) having a wavelength of 8 to 14 μm are used. As a technique to escape from these detections, it is required to suppress heat radiation in these wavelength regions. Therefore, it is important to coat or install a material having a low emissivity on the surface of the substrate used for the above-mentioned vehicles, flying objects, ships and the like.

Patent Document 1 discloses a thermal camouflage laminate. The thermal camouflage laminate of Patent Document 1 has a structure in which a layer made of metal and polyethylene is laminated on the surface of a cloth or the like, and the emissivity of MWIR or LWIR is suppressed in the range of 0.4 to 0.95.

Patent Document 2 discloses a camouflage combat clothing in which a metal material is treated on the surface of the fabric and a camouflage-like print of three or more colors is applied to the treated surface. The camouflage combat uniform of Patent Document 2 is characterized in that the area-weighted average emissivity of the surface of the cloth is 0.4 to 0.85, and the difference in maximum emissivity between each color is 0.1 to 0.6.

Patent Document 3 discloses a radiation-suppressing film containing a porous body in which a transparent material in the LWIR region such as ZnSe and ZnS is used as a matrix material and pores are dispersed with a porosity of, for example, 20 to 70%.

CITATION LIST

Patent Document

Patent Document 1: U.S. Pat. No. 4,529,633
Patent Document 2: Japanese Unexamined Patent Publication No. 2004-053039
Patent Document 3 WO 2020/241388

SUMMARY OF INVENTION

Technical Problem

The fabric-based structure disclosed in Patent Documents 1 and 2 are often not suitable for use in infrared stealth for vehicles, projectiles, ships, etc., in addition to insufficient reduction of emissivity.

Patent Document 3 describes, as an example of a porous body, a sintered body having pores inside obtained by sintering ZnS powder. However, when a structure having high stealth property is to be manufactured by sintering, sufficient strength may not be obtained, and further improvement is required.

An object of the present invention is to provide a sintered body having sufficient strength and having an infrared stealth effect in an infrared region such as a MWIR region and an LWIR region, and a method for producing the same.

Solution to Problem

The sintered body of the present embodiment comprises (a) a matrix material comprising at least one selected from ZnS and ZnSe, (b) an oxide comprising at least one metal selected from the group consisting of Ca, Sr and Ba, and (c) pores.

The method for producing a sintered body of the present embodiment comprises a mixing step of mixing (i) a matrix material powder comprising at least one selected from ZnS and ZnSe and (ii) a carbonate powder to form a powder mixture; and a sintering step of sintering the powder mixture to form a sintered body having pores.

Advantageous Effect of Invention

According to the present embodiment, it is possible to provide a sintered body having sufficient strength and having an infrared stealth effect in an infrared region such as a MWIR and LWIR region, and a method for producing the same.

DESCRIPTION OF EMBODIMENTS

Figure 1:
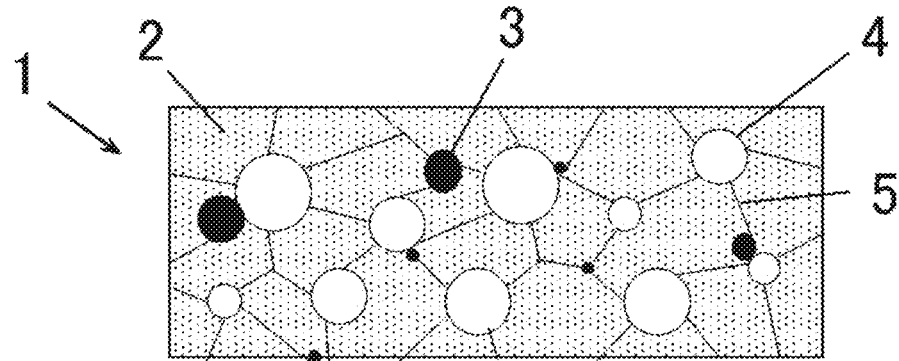
FIG. 1 is a drawing for explaining a structure of a sintered body according to an embodiment of the present invention.

The structure of the sintered body according to the present embodiment is schematically shown in FIG. 1. A sintered body 1 is mainly obtained by sintering a mixture containing powder (particles) of a matrix material 2, and the particles of the matrix material 2 are bonded to adjacent particles at a grain boundary 5 as shown in FIG. 1. The sintered body 1 of the present embodiment contains an oxide 3 and further has pores 4 (or voids). Here, the oxide is present in a form of islands, namely a plurality of islands of the oxide 3 is present in the matrix material 2. Also, a plurality of pores 4 is present in the matrix material 2.

The matrix material 2 is a material in which raw material powders (particles) containing at least one selected from ZnS and ZnSe are sintered and bonded. The term "particle" used herein means not only particles before sintering, but also each of the particles after sintered and bonded together with grain boundaries. The "matrix material" is a main material forming the structure of the sintered body, and comprises at least one selected from ZnS and ZnSe, preferably one of them, at a ratio of 70 mol % or more, preferably 90 mol % or more, most preferably 100% of the matrix material. The term "matrix material" is also used herein for particles before and after sintering (e.g., ZnS or ZnSe particles) and for sintered structures in which a large number of particles are sintered and bonded. As ZnS or ZnSe, crystals having a cubic sphalerite structure are desirable, but crystals having a hexagonal wurtzite structure may be included.

Figure 2:
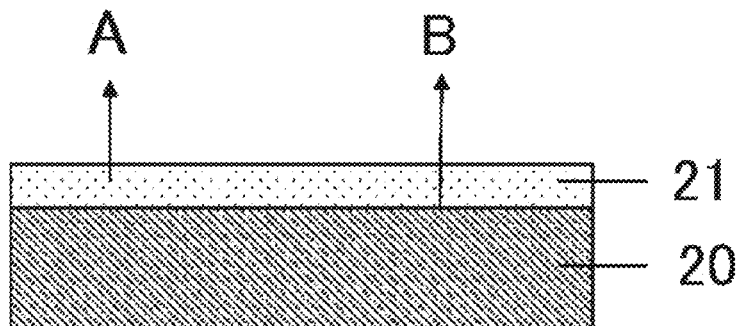
FIG. 2 is a drawing for explaining a function of a sintered body as an infrared stealth material according to the embodiment of the present invention.

FIG. 2 shows a diagram illustrating infrared radiation when the infrared stealth material 21 is formed on a surface base body 20 of a vehicle, a flying object, a ship, or the like. Infrared detection in the MWIR and LWIR regions mainly detects radiated infrared rays in these wavelength regions. The first characteristic required for an infrared stealth material is that "infrared radiation A of the material itself" is required to be small. As the second characteristic, when a transparent material in the infrared region such as ceramics is used as an infrared stealth material, it is also important not to transmit "infrared radiation B from the base body 20". It is known that ZnS and ZnSe have a large transmittance in the MWIR region and the LWIR region, that is, a small absorptance. Since the absorptance is equivalent to the emissivity under thermodynamic equilibrium conditions according to Kirchhoffs law, transparency indicates low emissivity, that is, the infrared emission A from the material itself is small. On the other hand, the infrared radiation B from the base body is transmitted.

Figure 9:
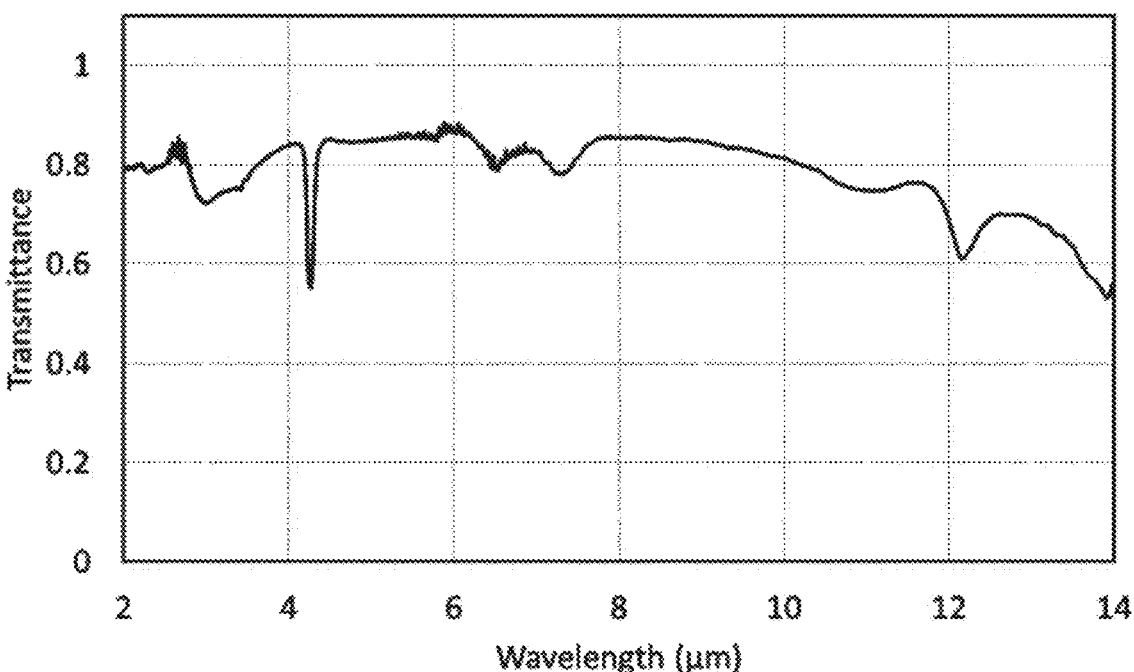
FIG. 9 is an FT-IR spectrum showing the transmittance of the ZnS sintered body of Comparative Example 1.

FIG. 9 shows a transmission spectrum of a ZnS sintered body having almost no pores (porosity 0.7%) having a thickness of 1.5 mm, which was prepared as Comparative Example 1 described later. It can be seen that the sintered body is also transparent (high transmittance) in the MWIR region and the LWIR region. Therefore, it can be seen that the ZnS sintered body satisfies the first characteristic.

Figure 7:
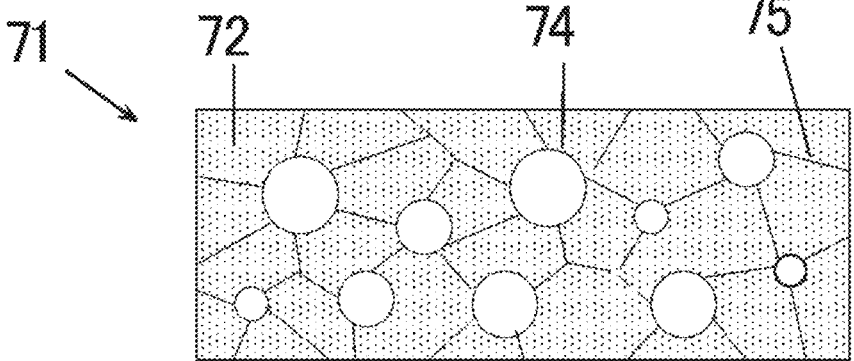
FIG. 7 is a drawing for explaining the structure of a conventional ZnS sintered body having pores.

In order to satisfy the second characteristic, the present inventor proposed to introduce pores in a ZnS or ZnSe sintered body in Patent Document 3. As schematically shown in FIG. 7, this structure has a structure in which pores 74 are introduced into a sintered body 71 in which powder (particles) of ZnS or ZnSe (matrix material 72) have been sintered at grain boundaries 75. In this structure, since ZnS or ZnSe particles, pores and grain boundaries are present, infrared radiation from the substrate is scattered, so that transmission can be significantly suppressed. However, when the pores are introduced by a method of adjusting the usual sintering conditions, the bond between the particles is weak and the strength may be insufficient.

On the other hand, in the structure of the present embodiment shown in FIG. 1, since the oxide 3 is present, the bonding force between the particles is large even if the pores 4 are formed.

The oxide 3 is an oxide containing at least one metal selected from the group consisting of Ca, Sr and Ba. As will be described later, this oxide is formed as a result of the decomposition of these metal carbonates to generate $CO_2$ gas.

Here, the type of the oxide containing at least one metal of Ca, Sr and Ba (hereinafter, may be referred to as metal $M^1$) is not limited, but CaO and the like (that is, CaO, SrO and BaO) have a problem of reacting with $CO_2$ in the air or reacting with water to form Ca(OH)2 and the like. When these reactions occur, the absorptance (emissivity) of the infrared region becomes large, and the problem of environmental reliability arises. Therefore, it is desirable that the oxide 3 further comprises at least one metal (hereinafter, may be referred to as metal $M^2$) selected from Ti and Zr that form a stable composite oxide with Ca and the like in the atmosphere.

It is preferable that the metal $M^2$ forms a composite oxide together with the metal $M^1$, which is represented by $M^1M^2O_3$ (wherein $M^1$ represents at least one metal selected from the group consisting of Ca, Sr or Ba, and $M^2$ represents at least one metal selected from the group consisting of Ti or Zr). Since the presence of the metal $M^2$ stabilizes the metal $M^1$ such as Ca in the sintered body, the amount of the metal $M^2$ with respect to the metal $M^1$ is 0 mol % or more, preferably more than 0 mol %, more preferably 90 mol % or more, and most preferably 100 mol % (equimolar) because all the metals $M^1$ such as Ca are stabilized quantitatively Herein, the metal $M^2$ may be present in excess of the metal $M^1$, for example in the form of $TiO_2$ or the like, in order to avoid the presence of CaO or the like. However, in general, the amount of the metal $M^2$ is preferably 200 mol % or less, more preferably 150 mol % or less, and yet more preferably 110 mol % or less of the metal $M^1$.

The amount of the oxide such as Ca oxide is more than 0 mol %, preferably 0.1 mol % or more, more preferably 0.2 mol % or more, still more preferably 0.5 mol % or more, based on the matrix material (ZnS or ZnSe). While the oxides such as Ca oxide are also a scattering source of transmitted infrared rays, they also become an infrared radiation source if the ratio to the entire sintered body is large. Therefore, the amount of the oxide such as Ca oxide is preferably 5 mol % or less, more preferably 4 mol % or less based on the matrix material. Here, for example, CaO, $CaTiO_3$, $TiO_2$ and the like are counted as 1 mol each. The size and shape of the oxide particles are not limited.

The porosity is preferably 10% or more in order to obtain sufficient infrared scattering. Further, if the porosity is too large, the strength of the structure becomes small, so that the porosity is preferably 40% or less. The shape and size of the pores are not limited, but the pore diameter is preferably 5 µm or less, more preferably 3 µm or less. Further, although there is no particular lower limit, the pore diameter is preferably, for example, 0.1 µm or more. The pore diameter can be determined, for example, by selecting arbitrary points (for example, 10 to 50 points) among pores observed in the SEM image of the fracture surface of the sintered body. Among the pores whose diameter have been determined, preferably 80% or more, more preferably 90% or more, and most preferably 100% have the above-mentioned preferable diameter (5 µm or less or 3 µm or less). Further, those having dispersed pore diameter can suppress a wide range of wavelengths.

The size of the entire sintered body when used as a stealth material is not limited, but it is preferred that the thickness is at least 0.2 mm or more, preferably 0.8 mm or more from the viewpoint of suppressing infrared transmission from the base body. Further, although there is no particular upper limit on the thickness, it is usually 5 mm or less, for example, 2 mm or less.

Next, a method for producing a sintered body having pores, which is another embodiment of the present invention, will be described. In the present embodiment, (i) a matrix material powder comprising at least one selected from ZnS and ZnSe and (ii) a carbonate salt powder are mixed to obtain a powder mixture (mixing step), and then the powder mixture is sintered (sintering step), thereby forming a sintered body having pores. If a carbonate salt is added to the raw material powder and sintering is performed, the carbonate salt is decomposed to generate carbon dioxide ($CO_2$), which contributes to the formation of pores. If sintering is performed at a temperature at which ZnS or ZnSe is sufficiently sintered without the addition of the carbonate salt, necking and grain growth occur, so that the bond at the grain boundaries becomes strong, but the pores also decrease. However, if sintering is performed with the addition of the carbonate salt, the carbonate salt is decomposed to generate $CO_2$, so that the binding of grain boundaries and the formation of pores advance simultaneously, providing a sufficient porosity.

The carbonate salt is not particularly limited, but one having a decomposition temperature close to the sintering temperature is preferable. For example, a carbonate of at least one metal (metal $M^1$) selected from the group consisting of Ca, Sr and Ba is preferable, and the examples thereof include $CaCO_3$, $SrCO_3$ and $BaCO_3$. These may be hydrates. Among these, $CaCO_3$ (calcium carbonate) is most suitable because the decomposition temperature thereof is close to the sintering temperature of ZnS or ZnSe.

Further, $M^1CO_3$ ($M^1$ represents Ca, Sr and Ba) produces $M^1O$ and $CO_2$ by thermal decomposition, but since $M^1O$ such as CaO is not stable in the atmosphere, it is preferable to add and mix at least one oxide of a metal (metal $M^2$) selected from Ti and Zr to the raw material powder (namely, the powder mixture) together with a carbonate salt, and then perform firing the mixture to cause sintering. In the sintering step, $M^1M^2O_3$ (where $M^1$ represents Ca, Sr and Ba and $M^2$ represents Ti and Zr) and $CO_2$ are produced as shown in the following reaction formula. $M^1M^2O_3$ is stable in the atmosphere.

$$CaCO_3 + TiO_2 => CaTiO_3 + CO_2$$

The amount of the metal $M^1$ carbonate added and the amount of the metal $M^2$ oxide added can be set so that the amounts of the metal $M^1$ and the metal $M^2$ are the amounts described for the "sintered body of the present embodiment".

In the sintering step, it is desirable to perform the sintering in vacuum or in an atmosphere of an inert gas in order to prevent oxidation of ZnS and ZnSe. If the temperature rise time is long, the decomposition or reaction of the carbonate salts may take place before the start of sintering of ZnS or ZnSe, and sufficient pores cannot be obtained. Therefore, it is particularly preferable to sinter by a spark plasma sintering (SPS) method, which enables rapid temperature rise in vacuum. The rate of temperature rise is not limited, but it may be set, for example, 20° C./min to 1000° C./min, generally 20° C./min to 200° C./min, and as atypical example, at about 100° C./min. Further, the sintering temperature and the holding time are not limited, but the sintering temperature is preferably 800° C. to 1000° C., and the holding time is preferably 5 minutes to 60 minutes.

EXAMPLES

The present invention will be described in more details using Examples shown below, but the present invention is not limited to the following examples.

Example 1

In this example, a ZnS powder reagent having a purity of 99.99%, a standard reagent grade $CaCO_3$ powder, and a standard reagent grade $TIO_2$ (rutyl structure) powder were used. $CaCO_3$ and $TiO_2$, each 1 mol %, were added to ZnS, and mixed. The obtained raw material powder mixture was filled between upper and lower graphite punches via carbon paper in a graphite die having an inner diameter of 15 mm for an SPS sintering furnace. After evacuation in the SPS sintering furnace, the pressure was increased to 20 MPa, the temperature was raised at 100° C./min, and the temperature was maintained at 800° C. for 10 minutes for sintering.

The porosity was determined based on the density (p obtained by the following formula) of a sintered body measured by Archimedes method (liquid is water) and the theoretical density calculated from the raw materials charged composition. It was found that the porosity was 17%.

$$\rho = Wa \cdot \rho l/(Wa - Wl)$$

wherein, Wl: weight in water, Wa: weight in air, $\rho l$: density of liquid.

Figure 3:
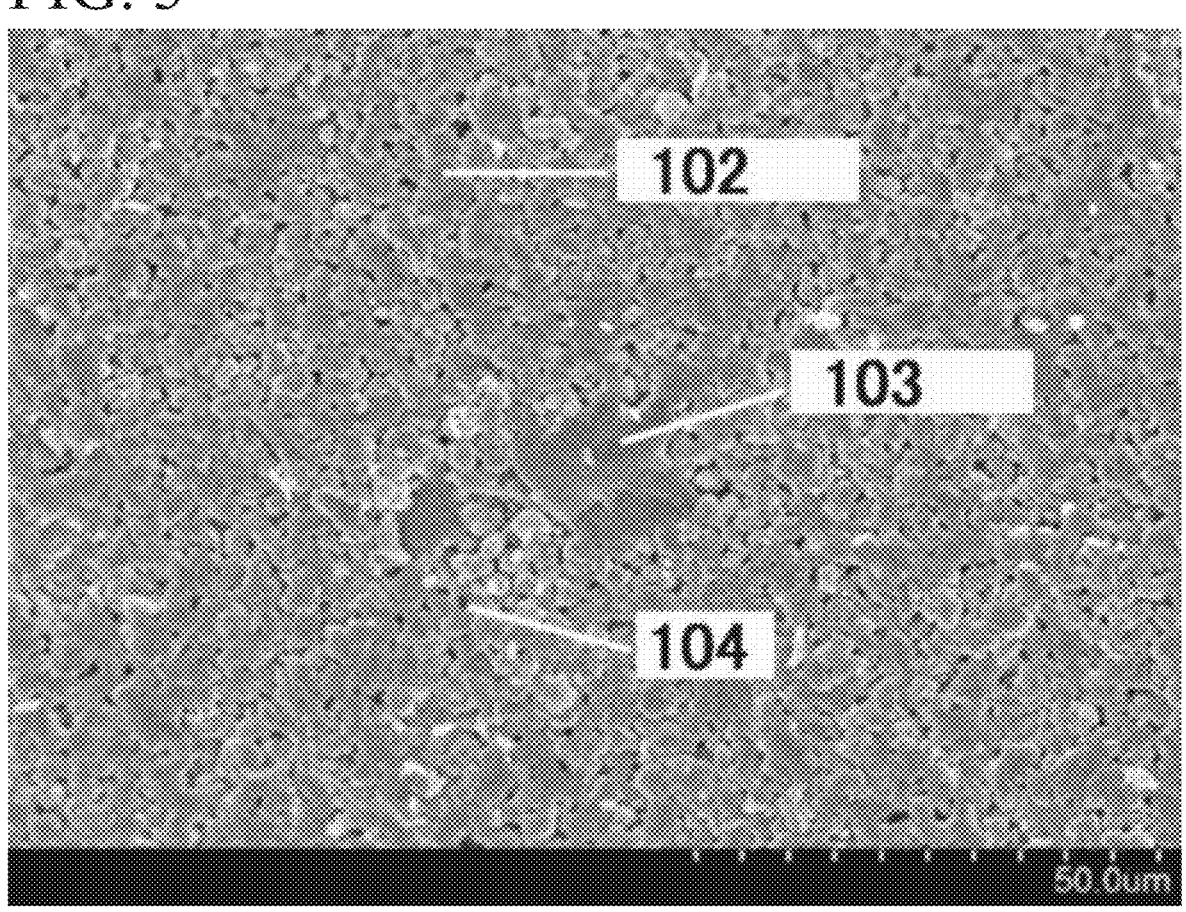
FIG. 3 is an SEM image showing a fractured surface of the ZnS sintered body of Example 1.
Figure 4:
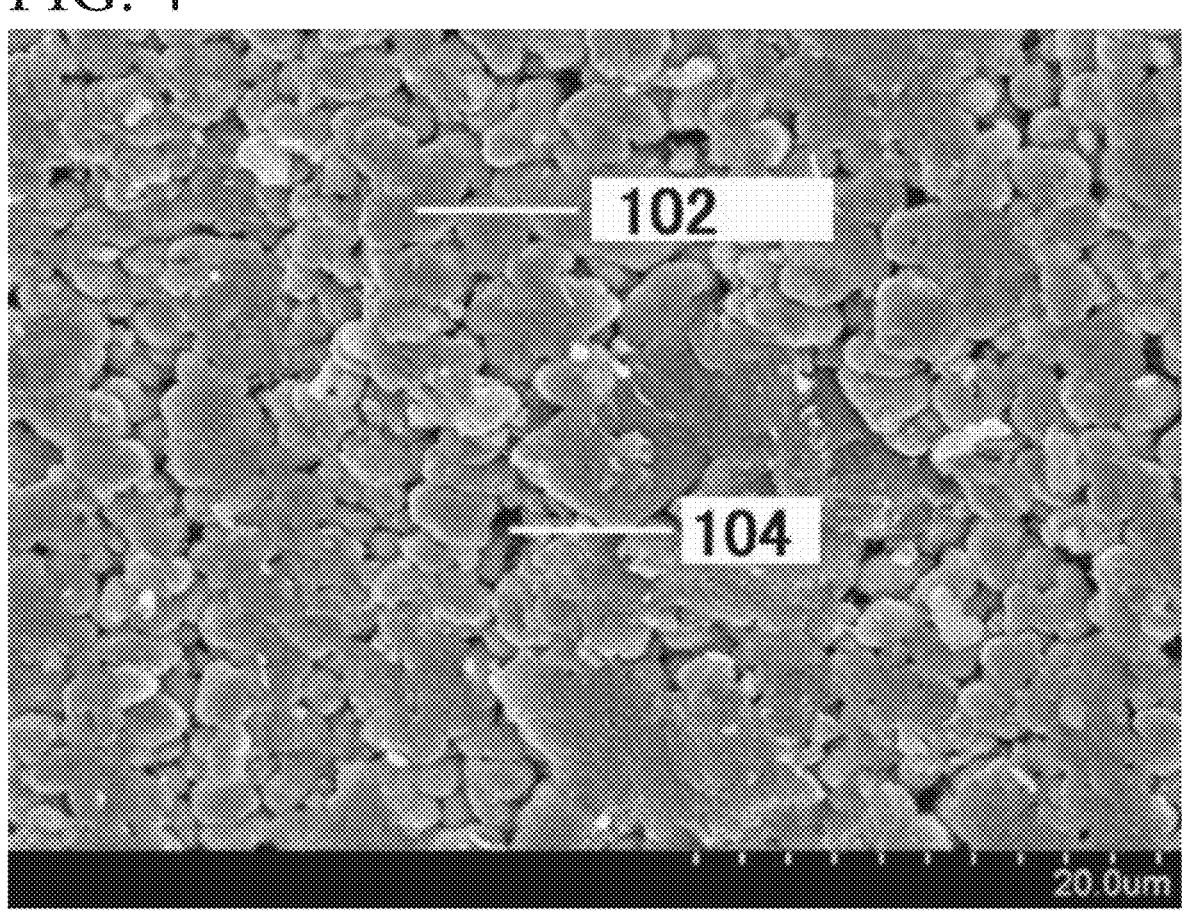
FIG. 4 is an SEM image showing a fractured surface of the ZnS sintered body of Example 1.

Table 1 shows the summary of the sintering conditions and the results of the porosity. FIGS. 3 and 4 show SEM images of fracture surfaces. ZnS particles 102, pores 104, and Ca oxides 103 are observed. Ca oxide was confirmed by an energy dispersive X-ray microprobe (EDX). The pores were formed irregularly between a plurality of ZnS particles, and most of them had a size of 2 μm or less, but the maximum size was 5 μm or less.

Figure 6:
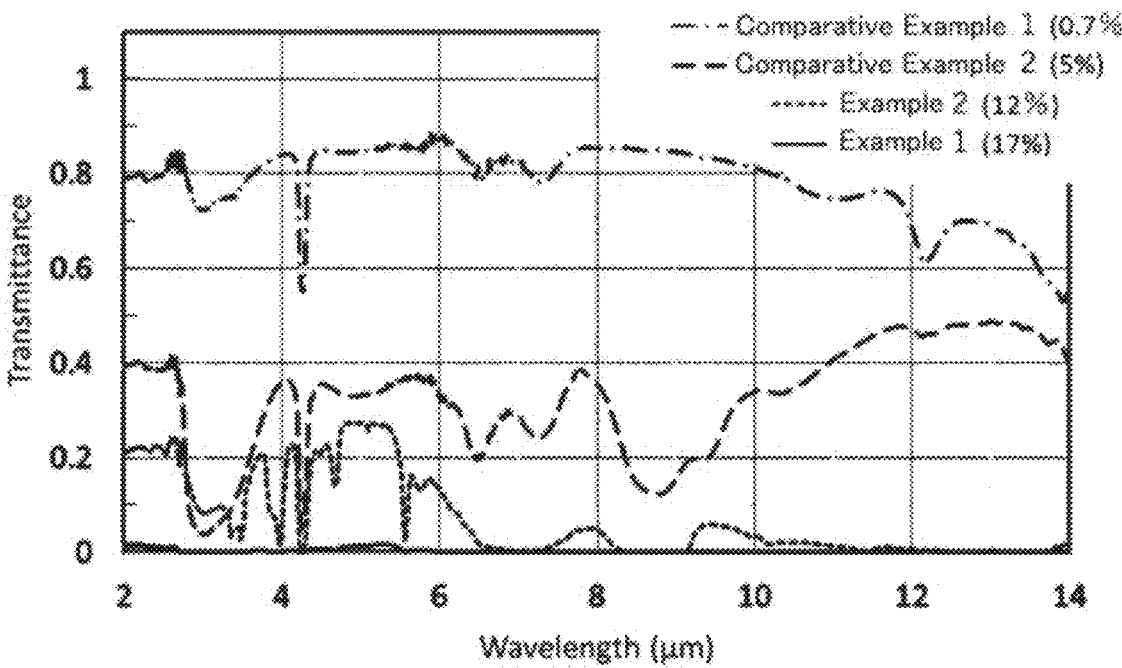
FIG. 6 is an FT-IR spectrum showing the transmittance of the ZnS sintered body of Examples 1 and 2 and Comparative Examples 1 and 2.

FIG. 6 also shows transmittance spectra of a sintered body pellet having a thickness of 1.5 mm measured by FT-IR. It was found that there is almost no transmittance over the MWIR region (wavelength 3 to 5 μm) and the LWIR region (wavelength 8 to 14 μm).

Example 2

Figure 5:
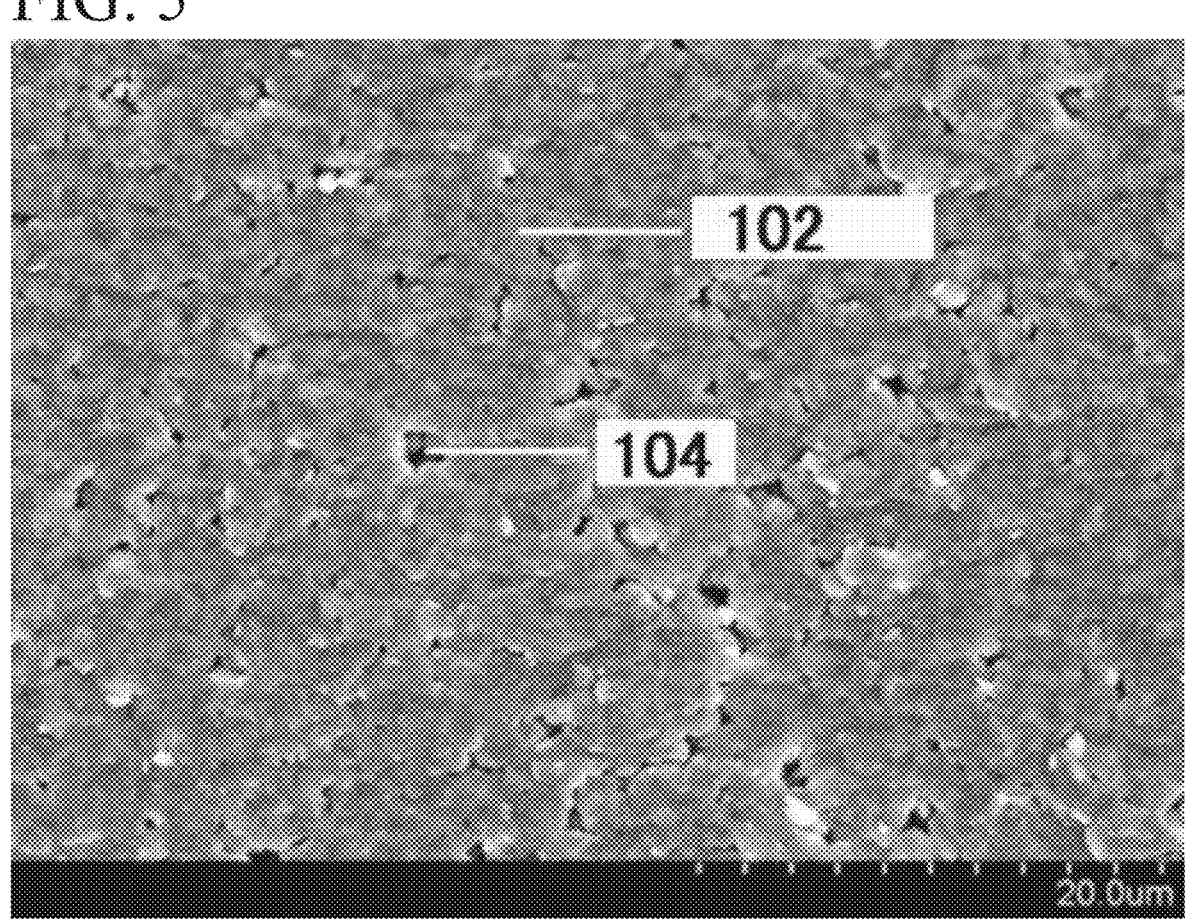
FIG. 5 is an SEM image showing a fractured surface of the ZnS sintered body of Example 2.

Sintering was performed under the same conditions as in Example 1 except that the pressure was increased to 50 MPa in the SPS sintering furnace. As a result, the porosity was 12%. The fracture surface SEM image of the obtained sintered body is shown in FIG. 5. It can be seen that the size of most pores 104 is 2 μm or less. FIG. 6 shows the transmission spectrum measurement results of the sintered pellets having a thickness of 1.5 mm by FT-IR. The average transmittance in the MWIR region was 0.2 or less, and the average transmittance in the LWIR region was 0.05 or less, showing that transmittances in the both regions were small.

Comparative Example 1

Figure 8:
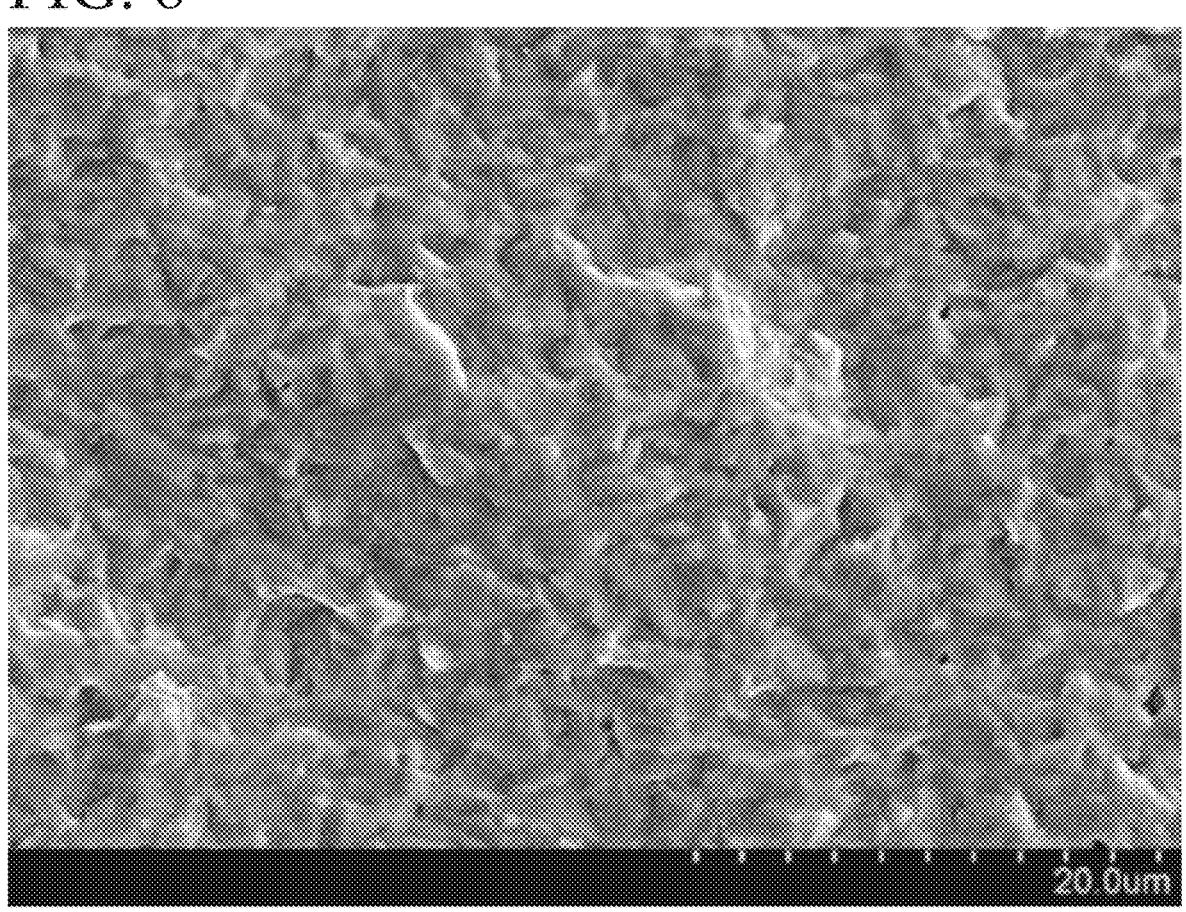
FIG. 8 is an SEM image showing a fractured surface of the ZnS sintered body of Comparative Example 1.

In this comparative example, a ZnS sintered body containing almost no pores was produced. Only ZnS was used as a raw material powder, and $CaCO_3$ powder and $TiO_2$ powder were not added. This raw material powder was set in an SPS sintering furnace in the same manner as in the examples, and heated at a heating rate of 10° C./min and held at a sintering temperature of 900° C. for 10 minutes to obtain a dense ZnS sintered body. The porosity was 0.7%. FIG. 8 shows a SEM image of a fracture surface of the obtained sintered body. It was found that a dense ZnS sintered body is observed and there are almost no pores.

FIG. 9 shows a transmission spectrum of the pellet having a thickness of 1.5 mm by FT-IR. The same transmission spectrum is also shown in FIG. 6 for comparison with Examples 1 and 2 and Comparative Example 2. In the MWIR region, the transmittance is about 0.8 over the entire wavelength range (3 μm to 5 μm). The absorption observed at wavelength of around 4.4 μm is that of $CO_2$, which is originated due to a measurement system because measurement was carried out in the atmosphere. In the LWIR region, the transmittance is about 0.7 on average, and it is clear that the infrared radiation from the base body is transmitted.

Comparative Example 2

Figure 10:
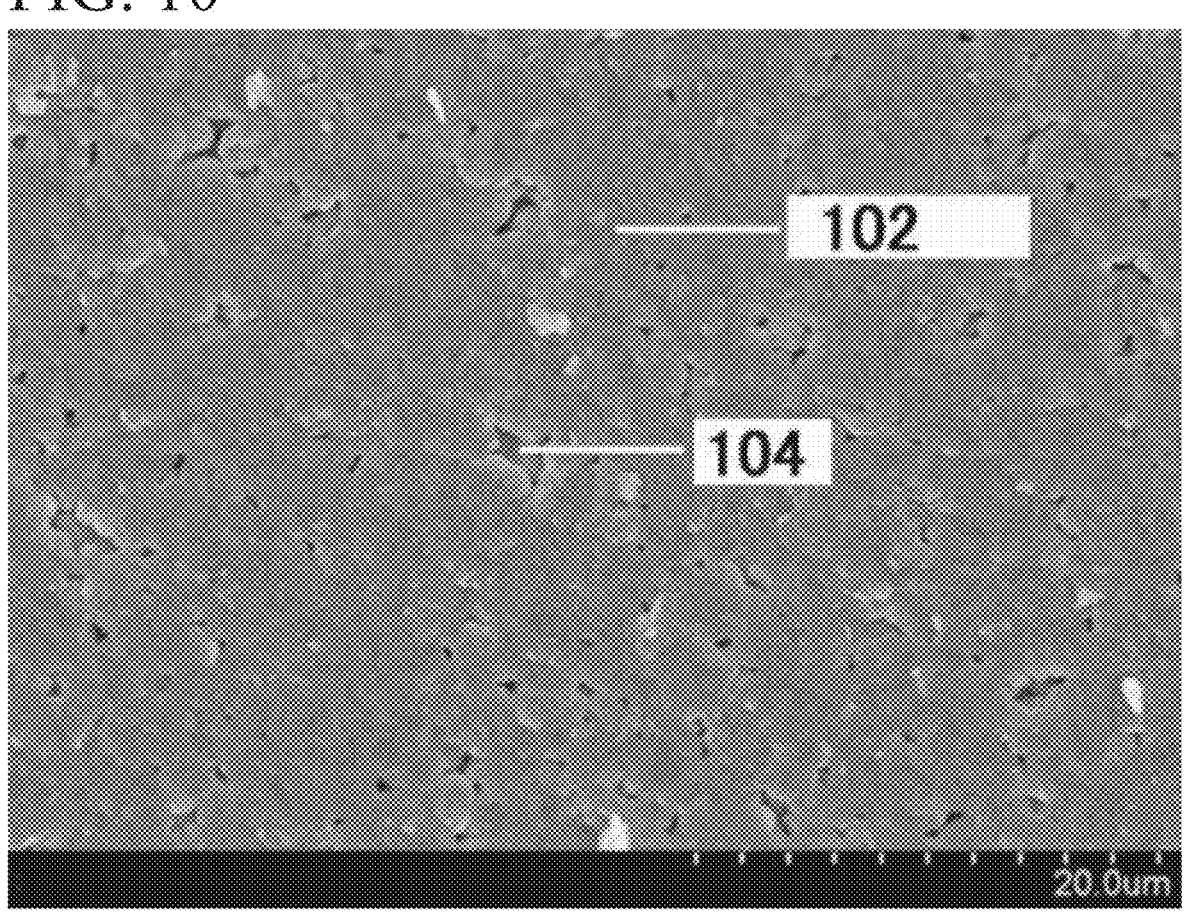
FIG. 10 is an SEM image showing a fractured surface of the ZnS sintered body of Comparative Example 1.

Only ZnS was used as a raw material powder and fired under the same conditions as in Example 2 to produce a sintered body. It was found that the porosity was 5%, which was smaller than that of Example 2. FIG. 10 shows a SEM image of a fracture surface of the obtained sintered body, where ZnS particles 102 and pores 104 are observed. The transmittance spectrum by FT-IR is shown in FIG. 6. Due to the presence of pores, the transmittance is reduced as compared with the dense ZnS sintered body of Comparative Example 1, but the transmittance is larger than that of the sintered body of Example 1 and Example 2. Namely, it was found that the maximum transmittance is about 0.4 in the MWIR region and about 0.5 in the LWIR region.

Comparative Example 3

Only ZnS was used as a raw material powder and sintering was attempted under the same conditions as in Example 1. However, when the pellet was taken out from the carbon paper, the pellet was broken. Although the reason is not clear why the pellet was not broken in the case of Example 1 in which $CaCO_3$ and $TiO_2$ were added, it is considered that the generated Ca oxide such as $CaTiO_3$ has an effect of stopping the crack growth.

TABLE 1

| | Sintering temperature (° C.) | Applied pressure (MPa) | Additives | Porosity (%) |
|---|---|---|---|---|
| Example 1 | 800 | 20 | 1% ($CaCO_3 + TiO_2$) | 17 |
| Example 2 | 800 | 50 | 1% ($CaCO_3 + TiO_2$) | 12 |
| Comparative Example 1 | 900 | 50 | None | 0.7 |
| Comparative Example 2 | 800 | 50 | None | 5 |
| Comparative Example 3 | 800 | 20 | None | Measurement impossible |

From Table 1, it was found that in the case of the same sintering conditions (Example 2 and Comparative Example 2), the porosity of Example 2 in which calcium carbonate and titanium oxide were added has a larger porosity. The larger the porosity, the more the transmittance is suppressed. The addition of a carbonate facilitates the production of ZnS sintered body having pores and calcium oxide and achieves the desired transmittance suppression.

Although the present invention has been described above with reference to the embodiments and examples, the present invention is not limited to the above embodiments and examples. Various changes that can be understood by those skilled in the art can be made within the scope of the present invention in terms of the configuration and details of the present invention.

Some or all of the above embodiments may also be described as in the appendix below, but the disclosures of the present application are not limited to the appendix be low.

8

Supplementary Note 1

1. A sintered body comprising:
(a) a matrix material comprising at least one selected from ZnS and ZnSe,
(b) an oxide that is present in a form of islands in the matrix material, comprising at least one metal selected from the group consisting of Ca, Sr and Ba, and
(c) pores that are present in the matrix material.

Supplementary Note 2

2. The sintered body according to Supplementary note 1, wherein the oxide further comprising at least one metal selected from Ti and Zr.

Supplementary Note 3

3. The sintered body according to Supplementary note 2, wherein the oxide is represented by $M^1M^2O_3$, wherein $M^1$ represents at least one metal selected from the group consisting of Ca, Sr and Ba, and $M^2$ represents at least one metal selected from the group consisting of Ti and Zr.

Supplementary Note 4

4. The sintered body according to Supplementary note 3, wherein the oxide is $CaTiO_3$.

Supplementary Note 5

5. The sintered body according to Supplementary note 1, wherein a porosity of the sintered body is 10% or more and 40% or less.

Supplementary Note 6

6. The sintered body according to Supplementary note 1, comprising pores having pore diameter of 5 μm or less.

Supplementary Note 7

7. A method for producing a sintered body comprising:
mixing (i) a matrix material powder comprising at least one selected from ZnS and ZnSe and (ii) a carbonate powder to form a powder mixture, and
sintering the powder mixture to form a sintered body having pores.

Supplementary Note 8

8. The method for producing a sintered body according to Supplementary note 7, wherein the carbonate powder is a carbonate powder of at least one metal selected from the group consisting of Ca, Sr and Ba.

Supplementary Note 9

9. The method for producing a sintered body according to Supplementary note 7, further comprising adding at least one oxide of a metal selected from Ti and Zr to the powder mixture

Supplementary Note 10

10. The method for producing a sintered body according to Supplementary note 7, wherein the sintering comprising a spark plasma sintering.

EXPLANATION OF REFERENCE

1 Sintered body
2 Matrix material
3 Oxide
4 Pore
5 Grain boundary
21 Infrared stealth material
20 Base body
71 Sintered body
72 Base material
74 Pore
75 Grain boundary
102 ZnS particle
103 Ca oxide
104 Pore
A Infrared radiation of the material itself
B Infrared radiation from the base body
The invention claimed is:
1. A sintered body comprising:
(a) a matrix material comprising at least one selected from ZnS and ZnSe, (b) an oxide that is present in a form of islands in the matrix material, comprising at least one metal selected from the group consisting of Ca, Sr and Ba, and (c) pores that are present in the matrix material.

2. The sintered body according to claim 1, wherein the oxide further comprising at least one metal selected from Ti and Zr.

3. The sintered body according to claim 2, wherein the oxide is represented by $M^1M^2O_3$, wherein $M^1$ represents at least one metal selected from the group consisting of Ca, Sr and Ba, and $M^2$ represents at least one metal selected from the group consisting of Ti and Zr.

4. The sintered body according to claim 3, wherein the oxide is $CaTiO_3$.

5. The sintered body according to claim 1, wherein a porosity of the sintered body is 10% or more and 40% or less.

6. The sintered body according to claim 1, comprising pores having pore diameter of 5 μm or less.

* * * * *